US008603666B2

(12) United States Patent
Nagamine et al.

(10) Patent No.: US 8,603,666 B2
(45) Date of Patent: Dec. 10, 2013

(54) POWER SUPPLY APPARATUS

(75) Inventors: Kouichi Nagamine, Toyota (JP);
Masahiro Imai, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 29 days.

(21) Appl. No.: 12/308,463

(22) PCT Filed: Apr. 24, 2008

(86) PCT No.: PCT/JP2008/057938
§ 371 (c)(1),
(2), (4) Date: Dec. 16, 2008

(87) PCT Pub. No.: WO2008/136353
PCT Pub. Date: Nov. 13, 2008

(65) Prior Publication Data
US 2009/0239136 A1 Sep. 24, 2009

(30) Foreign Application Priority Data
Apr. 26, 2007 (JP) ................................ 2007-117438

(51) Int. Cl.
*H01M 2/00* (2006.01)
(52) U.S. Cl.
USPC ............ 429/163; 429/148; 429/149; 429/177
(58) Field of Classification Search
None
See application file for complete search history.

(56) References Cited

U.S. PATENT DOCUMENTS

| 2,942,058 A | 6/1960 | Herold |
| 4,065,603 A | 12/1977 | Coibion |
| 5,800,942 A * | 9/1998 | Hamada et al. ............... 429/148 |

FOREIGN PATENT DOCUMENTS

| JP | A-2002-141036 | 5/2002 |
| JP | A-2004-071281 | 3/2004 |
| JP | 2006185815 A * | 7/2006 |
| JP | A-2006-236826 | 9/2006 |
| JP | A-2007-115437 | 5/2007 |
| WO | WO 2006/090904 A1 | 8/2006 |
| WO | WO 2006090904 A1 * | 8/2006 |

OTHER PUBLICATIONS

Dec. 29, 2011 Extended European Search Report issued in European Patent Application No. 08 75 2037.5.

* cited by examiner

*Primary Examiner* — Melvin C Mayes
*Assistant Examiner* — Colin W Slifka
(74) *Attorney, Agent, or Firm* — Oliff & Berridge, PLC

(57) ABSTRACT

A power supply apparatus that can achieve preferable holding and fixing of components constituting the power supply apparatus and can preferably prevent a liquid short-circuit and a leakage of current due to condensed water. The power supply apparatus includes a power supply unit having a plurality of power supply elements stacked with each other, an upper case and a lower case which house the power supply unit. The power supply further includes an auxiliary fastening portion which is fixed to the lower case and provides a space S between a lower surface of the power supply unit and the lower case, and fastening portions that are placed on the left and right of the power supply unit when viewed in a direction in which the power supply elements are stacked. The fastening portions fastening the power supply unit to the upper case.

10 Claims, 8 Drawing Sheets

POWER SUPPLY APPARATUS

TECHNICAL FIELD

The present invention relates to a power supply apparatus, and more particularly, to holding and fixing of components constituting a power supply apparatus, and to prevention of a liquid short-circuit and a leakage of current due to condensed water.

BACKGROUND ART

In conventional power supply apparatuses such as power storage apparatuses including secondary batteries and electric double layer capacitors and fuel cells, a power supply unit including a plurality of power supply elements (battery cells) stacked with each other is housed in a case formed of an upper case and a lower case. The power supply unit (assembled battery, battery module) is secured to the lower case by a fastening member such as a bolt.

The power supply apparatus including the power supply unit housed in the case is fixed to a vehicle body (floor) with the lower case (and/or the upper case) for mounting on the vehicle.

FIG. 8 is a section view showing the conventional power supply apparatus which is formed of a case member including an upper case 10 and a lower case 20 and a power supply unit (power supply module) 30 including a plurality of power supply elements (battery cells, power storage cells, fuel cells or the like) 35 stacked with each other and housed in the case member. The power supply unit 30 is fastened and fixed to the lower case 20, and an extending portion formed in each of the upper case 10 and the lower case 20 is fastened and fixed to a vehicle body 1, thereby mounting the power supply apparatus on the vehicle. Each of the plurality of the power supply elements 35 constituting the power supply unit 30 is formed of a power generation (power storage) element (diagonally shaded area in FIG. 8) and a resin member covering the power generation element. A fastening portion 34 formed in the power supply unit 30 is secured to the lower case 20 by a fastening member 40 in a vertical direction of the power supply unit 30.

Patent Document 1 has described a battery pack in which, in view of the effect of stress from thermal expansion of a power supply unit on a case, the power supply unit is fastened to a lower case by interposing an end plate. In the battery pack described in Patent Document 1, the lower case is not directly fastened to the end plate but is secured thereto with a rail member interposed therebetween.

[Patent Document 1] Japanese Patent Laid-Open No. 2005-141036 (FIGS. 1, 2, and the like)
[Patent Document 2] Japanese Patent Laid-Open 2004-071281

DISCLOSURE OF THE INVENTION

Problems to be Solved by the Invention

The conventional power supply apparatuses, however, have the following problems. Firstly, as shown in FIG. 8, each of the plurality of power supply elements 35 constituting the power supply unit 30 is fastened to the lower case 20 with the extended fastening portion 34 to secure the power supply unit 30 to the lower case 20. The fastening portion 34 is formed by extending the resin member forming part of the power supply element 35 as described above. The power supply unit 30 is secured to the lower case 20 only by the fastening portion 34.

Thus, the holding and fixing of the power supply unit 30 is not enough to withstand impact or load on the power supply apparatus. Specifically, only the fastening of the fastening portion 34 made of resin to the lower case 20 cannot provide sufficient strength (joint strength). Especially, since the power supply unit 30 is secured only to the lower case 20, the fastening point is under concentrated load upon impact or the like. As a result, the fastening of the power supply unit 30 to the lower case 20 cannot achieve preferable holding or fixing of the power supply unit 30 upon impact and the like.

Secondly, as shown in FIG. 8, the power supply unit 30 is fastened to the lower case 20 in the vertical direction of the power supply apparatus (power supply unit). In other words, the fastening axis extends vertically and the fastening member 40 is located below the power supply unit 30 (fastening holes in the lower case 20 and the fastening portion 34 of the power supply element 35 for fastening by the fastening member 40 are located closer to a lower surface of the power supply unit 30). For example, when steam contained in cooling wind condenses in each power supply element 35 into water droplets (condensed water), the adhering condensed water flows toward the lower case 20 and is led to the fastening member 40 fastening the power supply unit 30 to the lower case 20 or between the power supply unit 30 and the lower case 20.

Since the condensed water causes a short-circuit (liquid short-circuit) between power supply elements, a leakage of current between the lower case and the power supply element and the like, insulating treatment (anti-short-circuit treatment) or anti-corrosion treatment has conventionally been performed in the fastening point of the power supply unit 30 to the lower case 20. The treatment, however, increases the number of steps in an assembly process and the cost of the power supply apparatus. Particularly, even when the insulating treatment or the like is performed, the condensed water which may cause a liquid short-circuit or a leakage of current is still led to the fastening member 40 or the between the power supply unit 30 and the lower case 20. The insulating treatment or the like is not a preferable approach to the prevention of a liquid short-circuit or a leakage of current.

The upper case and the lower case made of resin or the like having insulation is not preferable in terms of concerns about heat and strength and is typically made of metal such as aluminum metal. For this reason, the insulating treatment or the like should be performed as described above to avoid a leakage of current between the power supply unit and the case.

In Patent Document 1, the paired end plates are fastened to the lower case with the rail member interposed therebetween, and the power supply unit (each power supply element) is fixed to the rail member such that the foot portion of the power supply unit is sandwiched between the rail member extending in a stacking direction and a clamp member. When condensed water is led to the rail member and the clamp member holding the power supply unit, a liquid short-circuit may occur between the power supply elements. Thus, Patent Document 1 has not provided a preferable approach to the prevention of a liquid short-circuit and a leakage of current as described above. In addition, Patent Document 1 presents a problem of cost since it increases the number of parts and the number of steps in an assembly process.

It is thus an object of the present invention to provide a power supply apparatus which can achieve preferable holding and fixing of components constituting the power supply apparatus and can preferably prevent a liquid short-circuit and a leakage of current due to condensed water.

Means for Solving Problems

According to an aspect of the present invention, a power supply apparatus comprises a power supply unit which includes a plurality of power supply elements stacked with each other, an upper case and a lower case which house the power supply unit, an auxiliary fastening portion which is fixed to the lower case and provides a space between a lower surface of the power supply unit and the lower case, and fastening portions which are placed on the left and right of the power supply unit when the power supply unit is viewed in a direction in which the power supply elements are stacked, the fastening portions fastening the power supply unit to the upper case.

The auxiliary fastening portion indirectly fastens the power supply unit to the lower case with the space interposed therebetween.

The power supply unit includes a pair of end plates placed at ends of the power supply elements stacked with each other and restraining the respective power supply elements in the stacking direction. And the auxiliary fastening portion is provided for the end plate.

The auxiliary fastening portion is provided for each of the end plates and the auxiliary fastening portions are formed to sandwich the power supply unit with the end plates interposed therebetween.

The end plates are made of resin. Also, the power supply apparatus further comprises a resin member placed between the end plate and the auxiliary fastening portion.

Each of the fastening portions includes a first fastening portion provided for the power supply unit and a second fastening portion provided for the upper case. The first and second fastening portions are fastened by a fastening member mounted in a horizontal direction of the power supply unit.

The first fastening portion is formed independently of the power supply unit.

The upper case is formed of a first case member and a second case member which are set in the horizontal direction of the power supply unit, respectively.

Effects of the Invention

According to the present invention, the space is provided between the lower surface of the power supply unit and the lower case and the power supply unit is fastened to the upper case. It is thus possible to provide the power supply apparatus which can achieve preferable holding and fixing of the components constituting the power supply apparatus. For that reason, the present invention can preferably prevent a liquid short-circuit and a leakage of current due to condensed water.

BEST MODE FOR CARRYING OUT THE INVENTION

Preferred embodiments of the present invention will hereinafter be described with reference to the drawings.

Embodiment 1

Figure 1:
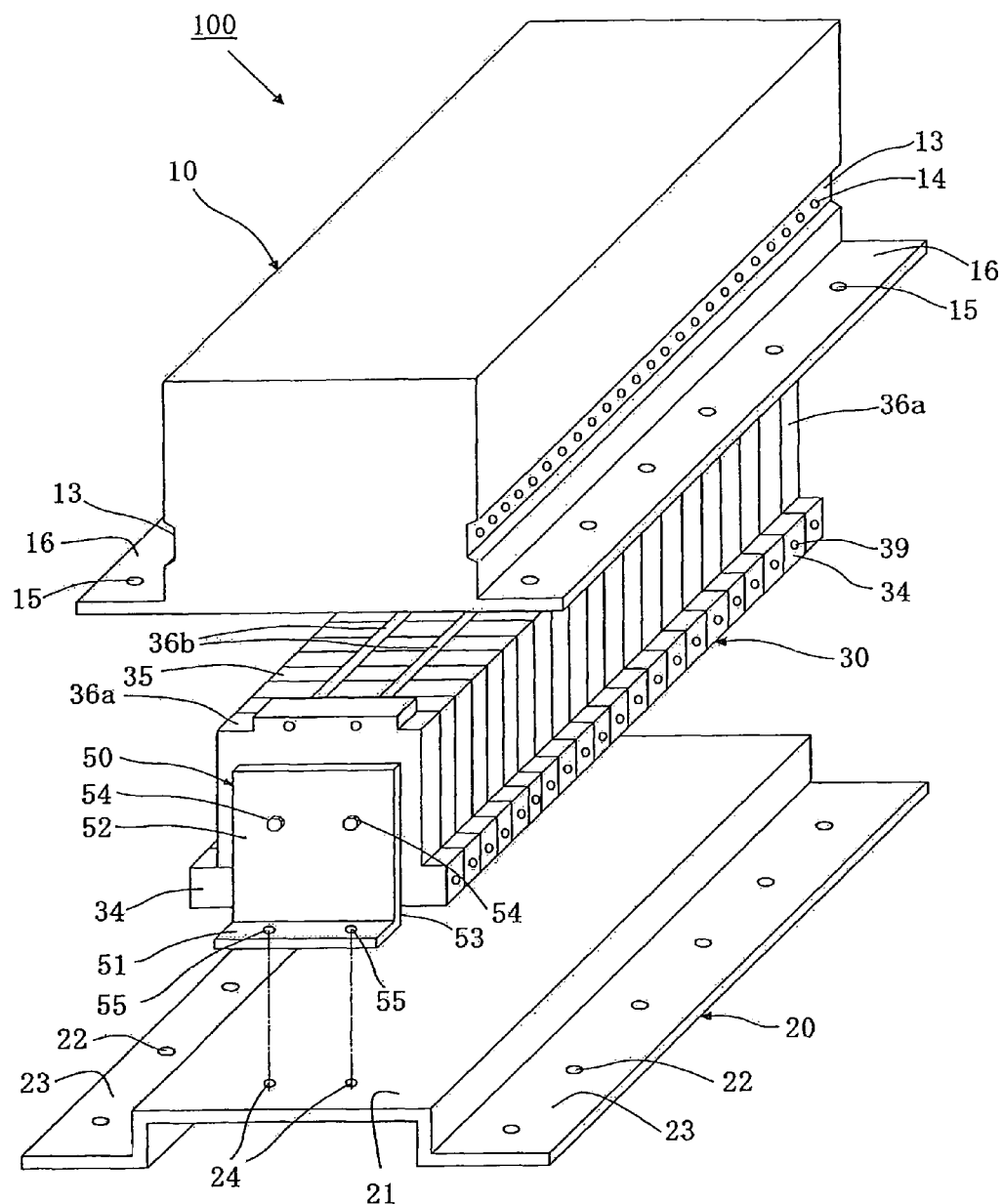
FIG. 1 An exploded perspective view showing a power supply apparatus in Embodiment 1 of the present invention.
Figure 2:
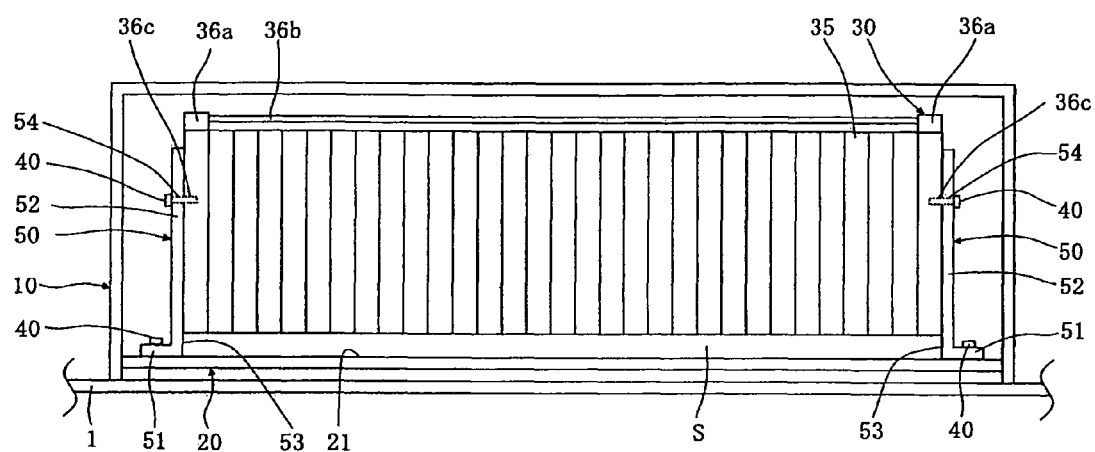
FIG. 2 A section view showing the power supply apparatus in Embodiment 1 of the present invention.
Figure 3:
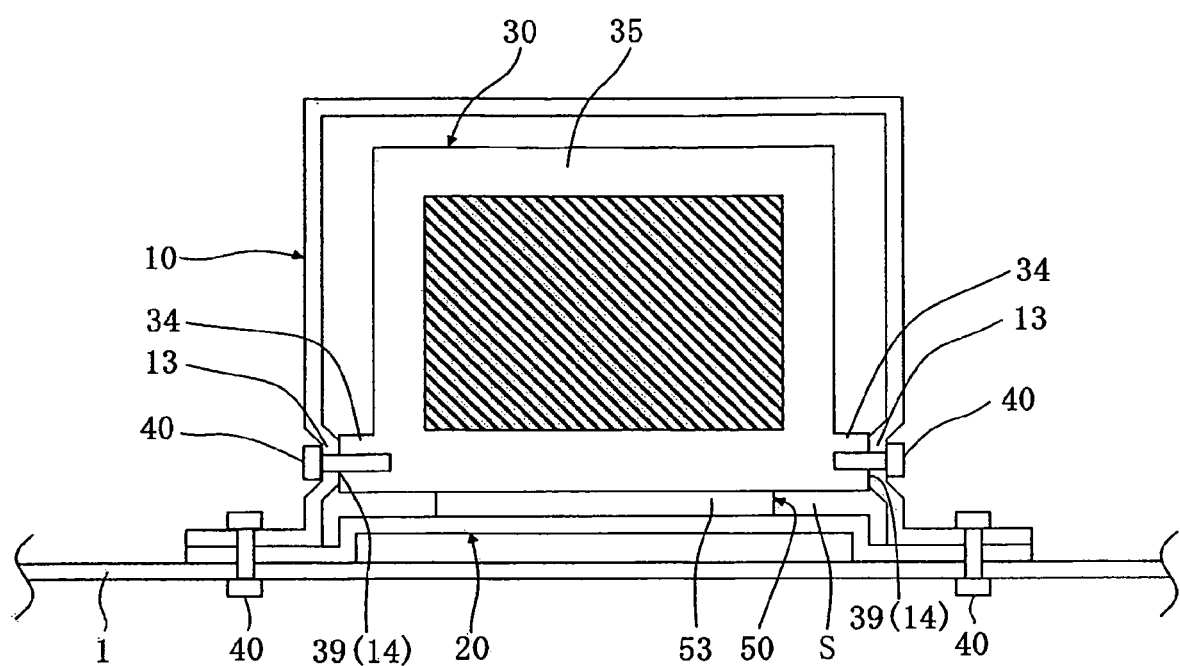
FIG. 3 A section view showing the power supply apparatus in Embodiment 1 of the present invention.

A power supply apparatus which is Embodiment 1 of the present invention will be described with reference to FIGS. 1 to 4. While a power storage apparatus is described as an example of the power supply apparatus in Embodiment 1, the present invention is applicable to another power supply apparatus such as a fuel cell. FIG. 1 is a perspective view showing the outer appearance of a battery pack serving as the power storage apparatus. FIG. 2 is a section view of the battery pack when viewed along a direction of stacking of the battery pack in FIG. 1 (in a direction orthogonal to the stacking direction). FIG. 3 is a section view of the battery pack in the stacking direction of the battery pack in FIG. 1.

In FIGS. 1 to 3, a battery pack 100 is formed of a battery module (power supply unit 30) including a plurality of battery cells (power supply elements) 35 stacked with each other, an upper case 10 and a lower case 20 which house the battery module 30, and an auxiliary fastening member 50 serving as an auxiliary fastening means which is fixed to the lower case 20 and provides a space S between a lower surface of the battery module 30 and the lower case 20. The battery pack 100 which houses the battery module 30 corresponds to the power supply apparatus described in claims.

Each of the plurality of battery cells 35 constituting the battery module 30 is formed of a power generation element (diagonally shaded area) and a resin member which covers the power generation element. The battery module 30 is formed of the battery cells 35, end plates 36a placed at both ends in the stacking direction, and lock bars 36b which couple the end plates 36a. The battery cells 35 are restrained between the end plates 36a. The end plate 36a in Embodiment 1 is made of insulating material such as resin.

Each of the power supply cells 35 is provided with a fastening portion (first fastening portion) 34 which extends (protrudes) in a horizontal direction from its side (on the left and right when viewed in the stacking direction) in a lower portion of the side. The first fastening portion is fastened to a fastening portion (second fastening portion) 13 of the upper case 10, later described, by a fastening member 40 such as a bolt mounted in the horizontal direction of the battery module 30 to provide a fastening portion (fastening means) to the upper case in Embodiment 1. The end plate 36a is formed to have the sectional shape corresponding to that of the battery cell 35 including the fastening portion 34.

The upper case 10 is provided with the fastening portion 13 for fastening to the fastening portion 34 of the battery cell 35. The fastening portion 13 is formed to protrude toward the battery module 30 (concaved on the side of the upper case 10) such that the protruding surface of the fastening portion 13 abuts on the fastening portion 34. The fastening member 40 is inserted into a fastening hole 39 formed in the fastening portion 34 of the power supply cell 35 and a fastening hole 14 formed in the fastening portion 13 of the upper case 10 to fasten the battery cell 35 (battery module 30) to the upper case 10.

The upper case 10 includes a flange portion 16 which has fastening holes 15 formed therein for fastening to the lower case 20 (including the fastening to a vehicle body 1).

The lower case 20 is provided with a laying portion 21 to which the auxiliary fastening member 50, later described, is fixed, over which the battery module 30 is placed with the space S interposed therebetween, and which has fastening holes 24 for securing a fixing portion 51 of the auxiliary fastening member 50, and a flange portion 23 having fastening holes 22 associated with the fastening holes 15 in the flange portion 16 of the upper case 10. The upper case 10 and the lower case 20 are made of metal material such as aluminum metal.

The auxiliary fastening member 50 is formed of an L-shaped plate member which includes a first fixing portion 51 formed generally in parallel with the laying portion 21 of the lower case 20 and fixed to the laying portion 21 of the lower case 20 and a second fixing portion 52 formed to extend in a vertical direction of the battery module 30 and fixed to the end of the end plate 36a in the stacking direction. The auxiliary fastening member 50 is placed at each end of the battery module 30 in the stacking direction. The fixing portion 52 is fixed to each of the end plates 36a such that the battery module 30 is not in contact with the lower case 20 after assembly, that is, such that the space S is formed between the lower surface of the battery module 30 and the lower case 20. The fixing portion 51 in Embodiment 1 is placed in the space between the upper case 10 and the battery module 30 and out of the space S formed between the lower surface of the battery module 30 and the lower case 20. The fixing portion 51 has fastening holes 55 formed therein associated with the fastening holes 24 formed in the laying portion 21 of the lower case 20.

More specifically, the fixing portion 52 is fixed to the end plate 36a such that a non-abutting area 53 which is part of the end face opposed to the battery module 30 and does not abut on (is not in contact with) the battery module 30 is provided between the battery module 30 and the lower case 20 (or the fixing portion 51). In other words, the fixing portion 52 is fixed to the end plate 36a such that the lower end of the fixing portion 52 is shifted from the lower end of the end plate 36a in the vertical direction (downward in FIG. 2). Thus, fastening holes 54 in the fixing portion 52 associated with fastening holes 36c formed in the end face of the end plate 36a are formed at the proper positions to shift the lower end of the fixing portion 52 from the lower end of the end plate 36a in the vertical direction (downward in FIG. 2) such that the space S is formed between the lower surface of the battery module 30 and the lower case 20.

As shown in FIG. 2, the auxiliary fastening members 50 are provided to sandwich the battery module 30 on both sides in the stacking direction to restrain the battery module 30 in the stacking direction. In other words, the auxiliary fastening members 50 in Embodiment 1 indirectly secure the battery module 30 to the lower case 20, form the space S between the battery module 30 and the lower case 20, and sandwich and restrain the battery module 30 on both ends in the stacking direction similarly to the end plates 36a. Since the auxiliary fastening members 50 in Embodiment 1 are responsible for improving the joint strength of the battery module 30 in this manner, the members 50 are made of material having certain strength such as metal.

Next, how to assemble the battery pack 100 in Embodiment 1 will be described. As shown in FIG. 1, the auxiliary fastening members 50 are first attached to the battery module 30 by using the fastening members 40. Then, the battery module 30 to which the auxiliary fastening members 50 are attached is placed on the laying portion 21 of the lower case 20, and the fixing portions 51 (the fastening holes 55) of the auxiliary fastening members 50 are fixed to the laying portion 21 (fastening holes 24). In this state, the space S is provided under the lower surface of the battery module 30, and the battery module 30 is not fastened directly to the lower case 20 by a fastening member such as a bolt or through engagement or fitting but is positioned and secured to the lower case 20 with the auxiliary fastening members 50 interposed. Next, the upper case 10 is placed from above the battery module 30 and the lower case 20, the fastening portion 13 of the upper case 10 is fastened to the fastening portion 34 of the battery module 30 by using the fastening member 40, and the flange portion 16 of the upper case 10 is fastened to the flange portion 23 of the lower case 20. In Embodiment 1, the fastening of the upper case 10 to the lower case 20 doubles as the fastening of the battery pack 100 to the vehicle body 1 (see FIG. 3).

As shown in FIG. 3, the lower surface of the battery module 30 of the battery pack 100 in Embodiment 1 is placed not in contact with the lower case 20 while the battery module 30 is fastened and fixed to the upper case 10. Specifically, in the battery pack 100 of Embodiment 1, the auxiliary fastening members 50 are placed on the battery module 30 and the fastening portions (13, 34) are provided on the left and right of the battery module 30 for fastening of the battery module 30 to the upper case 10. Thus, after the assembly, the space S is provided between the battery module 30 and the lower case 20 and the fastening members 40 are located on the left and right of the battery module 30. Since the fastening portions to the battery module 30 are not placed in the lower case 20 (below the battery cell 35) where condensed water reaches as described in the conventional example, the condensed water does not affect the fastening portions (13, 34).

More specifically, when the battery module 30 is fastened to the lower case 20 as in the conventional example, the fastening axis extends in the vertical direction of the battery pack 100. If condensation occurs, the resulting condensed water necessarily flows to the lower case below and comes into contact with the fastening portion of the battery module 30 to the lower case 20. In Embodiment 1, since the fastening axis extends generally in parallel with the horizontal direction of the battery pack 100 and the battery module 30 is directly fastened to the upper case 10, the condensed water flowing to the lower case 20 does not have any direct effect on the fastening portions. This can preferably prevent a failure such as a liquid short-circuit due to the condensed water.

The space S is formed between the battery module 30 and the lower case 20 to avoid pooling of condensed water between the battery module 30 and the lower case 20 in Embodiment 1. This can prevent a liquid short-circuit between the battery cells 35 due to the introduction of the condensed water between the battery cells 35 constituting the battery module 30 and a leakage of current from the battery cell 35 to the lower case due to the introduction of the condensed water between the battery cell 35 and the lower case 20.

Since the auxiliary fastening members 50 are placed on both ends of the battery module 30 in the stacking direction to sandwich the battery module 30, the members 50 restrain the respective battery cells 35 in the stacking direction similarly to the pair of the end plates 36a. This allows holding and fixing insensitive to deformation or movement of the battery module 30 upon impact or the like.

The battery module 30 is fixed not only to the upper case 10 but also to the lower case 20 indirectly by the auxiliary fastening members 50. This can improve the joint strength of the battery module 30 to realize the preferable holding and fixing of the battery module 30 upon impact and facilitate the positioning of the battery module 30. Specifically, in Embodiment 1, since the battery module 30 is not in contact with the lower case 20 when the components are assembled, the battery module 30 is easily positioned by using the auxiliary fastening members 50 to facilitate the assembly.

The end plate 36a is made of resin in Embodiment 1. Since the paired auxiliary fastening members 50 are placed on the respective end plates 36a to be responsible for restraining the battery module 30 by sandwiching it on both ends in the stacking direction, the auxiliary fastening members 50 can restrain the battery module 30 in an auxiliary manner even when the end plates 36a do not have enough strength to deal with the thermal expansion of the battery module 30. On the other hand, since the auxiliary fastening member 50 is made of metal, the end plate 36a made of resin serves as an insulating layer (thickness of the end plate 36a) to maintain a certain distance between the auxiliary fastening member 50 and the battery cell 35 to prevent a short-circuit and a leakage of current between the auxiliary fastening member 50 and the battery cell 35. Thus, preferably, the auxiliary fastening member 50 in Embodiment 1 is formed independently of the end plate and the conventional end plate 36a is not used as the auxiliary fastening member 50 in Embodiment 1.

Since the end plate 36a is made of resin, the end plate 36a can absorb vibrations transferred from the lower case 20 through the auxiliary fastening member 50. In this manner, the end plate 36a also serves as a vibration absorbing (buffer) member for the battery module 30.

Since the fastening portions between the battery module 30 and the case are located on the left and right, the fastening can be visually checked without removing the battery module 30 or the case when they are mounted on the vehicle. This can improve the maintainability of the battery pack 100.

Figure 4:
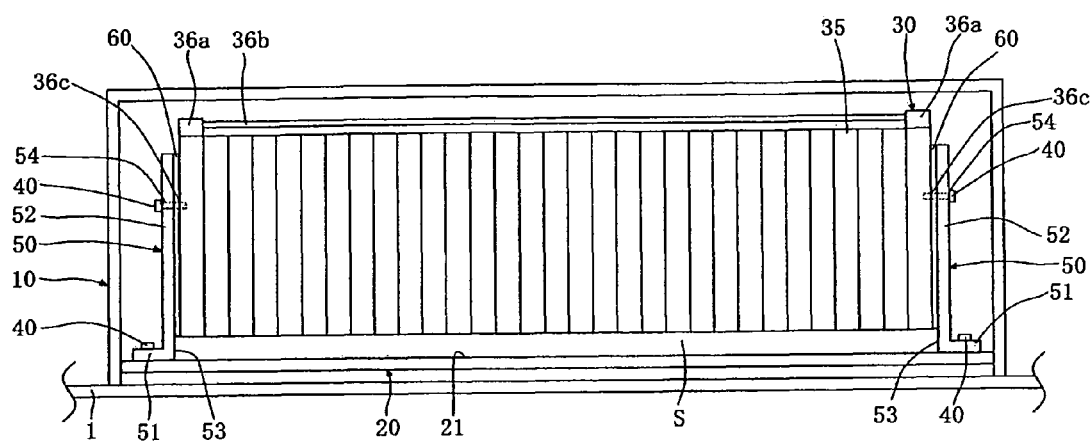
FIG. 4 A section view showing the power supply apparatus in Embodiment 1 of the present invention.

As shown in FIG. 4, a resin member 60 may be placed between the end plate 36a and the auxiliary fastening member 50. In this case, even when the end plate 36a is not made of resin, the resin member 60 provides insulation between the battery cell 35 and the auxiliary fastening member 50 and absorb and distribute vibrations transferred to the battery cell 35, so that preferable resistance to vibration can be achieved over the direct absorption of vibrations by the end plate 36a. For example, the end plate 36a may be made of metal having high strength or the like in view of the restraint of each battery cell 35, and the resin members 60 may be placed between the end plate 36a the auxiliary fastening member 50 and between the end plate 36a and the adjacent battery cell 35 to maintain the insulation from the battery cell 35 and realize preferable holding and fixing of the battery module 30.

Embodiment 2

A power supply apparatus which is Embodiment 2 of the present invention will hereinafter be described with reference to FIGS. 5 to 7. In Embodiment 2, an upper case 10 as in Embodiment 1 is divided into a pair of a first case member 11 and a second case member 12. In the following description, components identical to those in Embodiment 1 are designated with the same reference numerals and description thereof is omitted.

Figure 5:
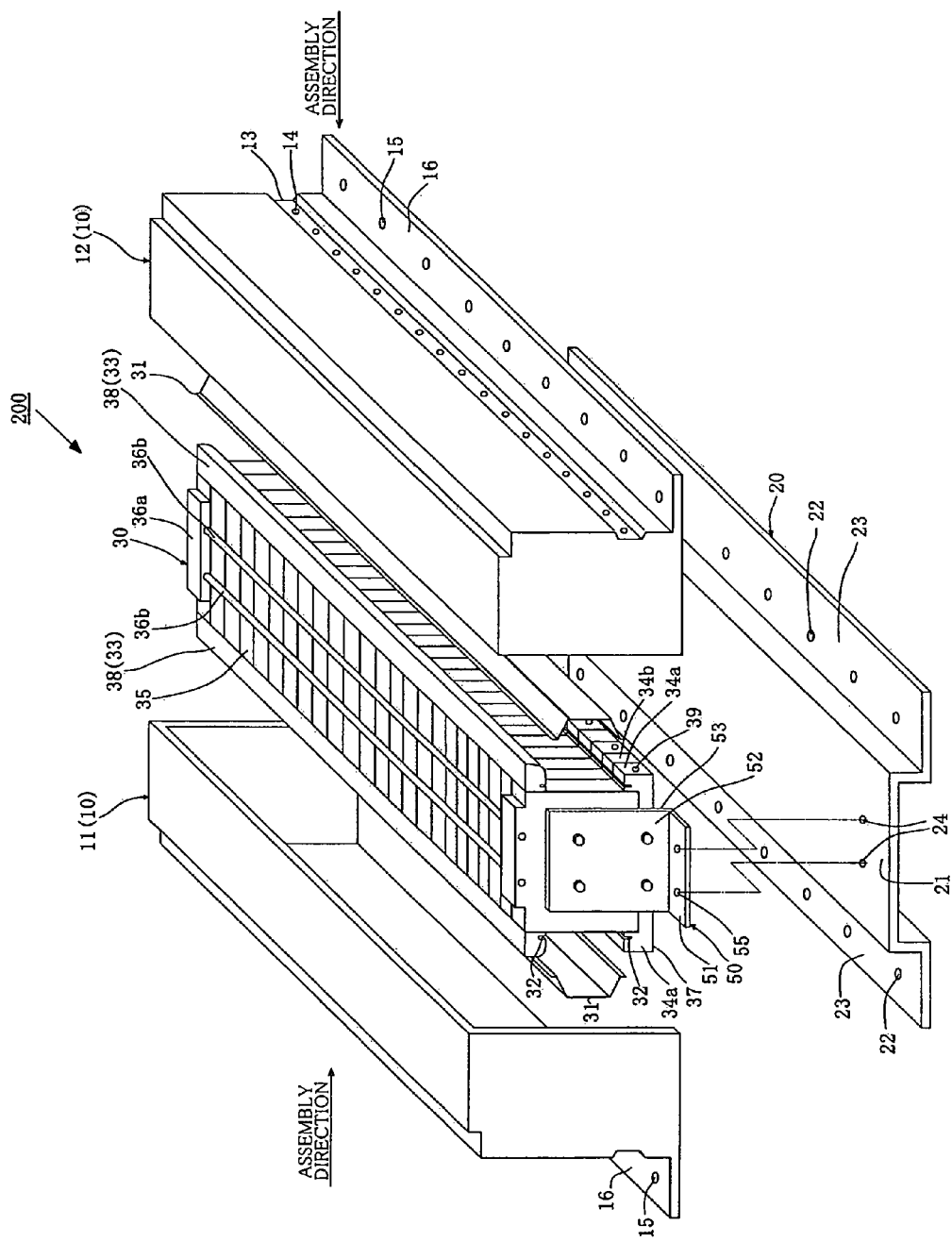
FIG. 5 An exploded perspective view showing a power supply apparatus in Embodiment 2 of the present invention.
Figure 6:
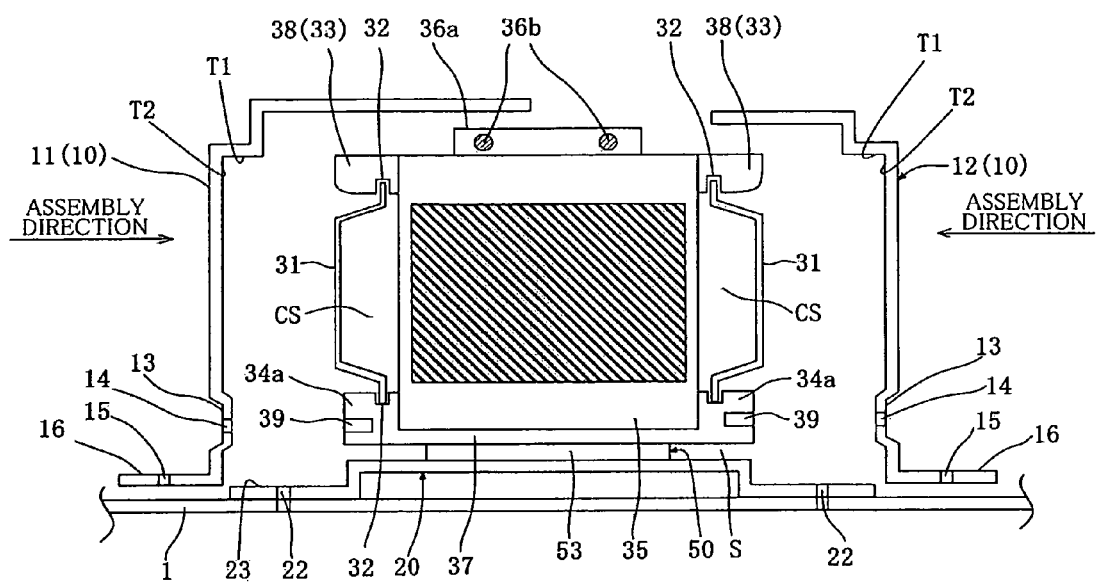
FIG. 6 A section view showing the power supply apparatus in Embodiment 2 of the present invention.

FIGS. 5 and 6 show a battery pack 200 of Embodiment 2 in which the upper case 10 is formed of the first case member 11 and the second case member 12, a cooling apparatus, not shown, is provided for taking cooling wind in from outside the battery pack 200 to cool a battery module 30, and a chamber 31 for forming a chamber space CS through which the cooling wind circulates is provided adjacent to each side (on the left and right) of the battery module 30. A laying member 37 is provided in a lower portion of each of battery cells 35. A chamber attaching member 38 is provided in an upper portion of the battery module 30. The laying member 37 and the chamber attaching member 38 have extending portions 34a and 33, respectively, which protrude from the side of the battery module 30 in a horizontal direction. The chamber 31 is placed between the extending portions located in the upper and lower portions of the battery module 30 and is installed through engaging portions 32.

The first and second case members 11 and 12 constituting the upper case 10 have fastening portions 13 for fastening to the battery module 30 at the sides on the left and right of the battery pack 200. In Embodiment 2, the battery module 30 is fastened to the first and second case members 11 and 12 with the interposed laying member 37 on which the battery cells 35 are placed. The fastening portion 13 is formed to protrude toward the battery module 30 (concaved on the side of the upper case 10) such that the protruding surface of the fastening portion 13 abuts on the extending portion 34a of the laying member 37.

Fastening holes 39 associated with fastening holes 14 in the fastening portions 13 are formed in the sides of the laying member 37 on the left and right, that is, in the sides facing the upper case 10 on the left and right of the battery pack 200. The extending portions 34a of the laying member 37 correspond to the fastening portions 34 in Embodiment 1 described above. As shown in FIG. 5, the fastening holes 39 can be formed in alternate extending portions 34a (34b) in the stacking direction of the battery cells 35 without forming the fastening holes 39 in the respective extending portions 34a of the laying member 37, for example. The fastening holes 39 may be formed in the respective extending portions 34a of the laying member 37 as in Embodiment 1. The chamber attaching member 38 is formed as a long member formed independently of the battery cells 35 and extending in the stacking direction of the battery cells 35.

Figure 7:
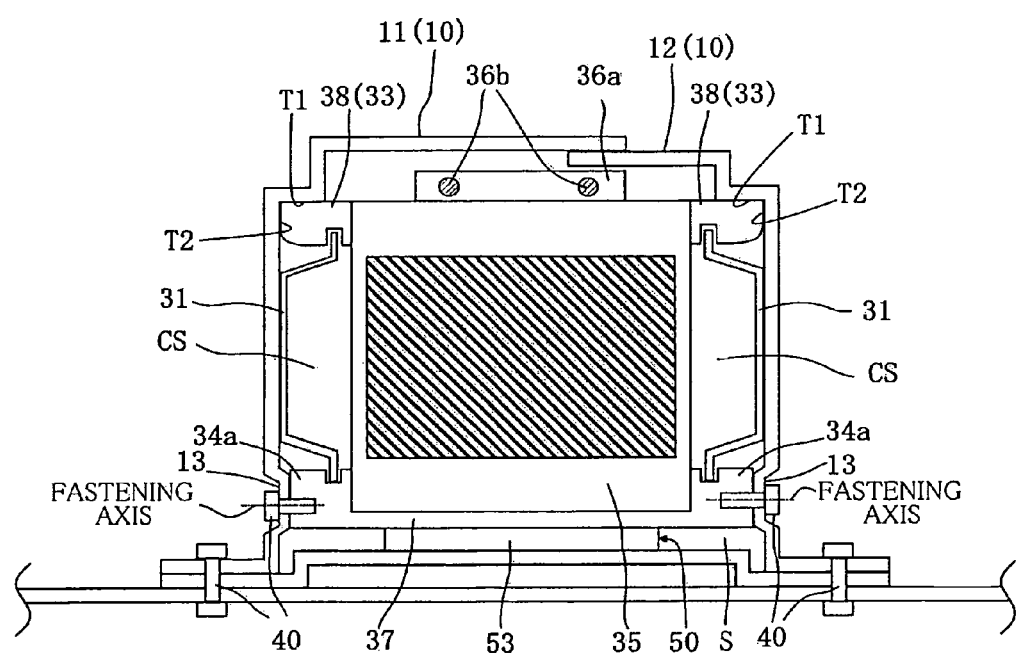
FIG. 7 A section view showing the power supply apparatus in Embodiment 2 of the present invention.

FIGS. 6 and 7 are explanatory views for describing how to assemble the battery pack 200 in Embodiment 2 and section views in a plane orthogonal to the stacking direction of the battery cells 35. As shown in FIG. 6, in the battery pack 200 of Embodiment 2, the battery module 30 having an end plate 36a to which an auxiliary fastening member 50 is attached is placed on a laying portion 21 of a lower case 20, and a fixing portion 51 (fastening hole 55) of the auxiliary fastening member 50 is secured to the laying portion 21 (fastening hole 24), as in Embodiment 1. In this state, a space S is provided under a lower surface of the battery module 30, and the battery module 30 is not fastened directly to the lower case 20 by a fastening member such as a bolt or through engagement or fitting but is secured to the lower case 20 with the auxiliary fastening member 50 interposed therebetween, and the battery module 30 is positioned relative to the lower case 20.

Next, while the battery module 30 is fixed and positioned to the lower case 20 with the space S interposed therebetween, the first case member 11 and the second case member 12 are set from the left and the right, respectively, to sandwich the battery module 30. The inner surfaces of the first case member 11 and the second case member 12 abut on the chambers 31 and the fastening portions 13 abut on the extending portions 34a of the laying member 37 after the assembly. The first and second case members 11 and 12 are provided such that at least portions thereof, for example their upper portions overlap each other and they cover the whole battery module 30 after the assembly. The first and second case members 11 and 12 are not directly coupled, but they may be structured to be coupled directly.

After the first and second case members 11 and 12 are installed, the fastening portions 13 of the first and second case members 11 and 12 are fastened to the extending portions (fastening portions) 34a of the laying member 37 by fastening members 40 such as bolts, and flange portions 16 of the first and second case members 11 and 12 are fastened to respective flange portions 23 of the lower case 20.

In this manner, the upper case 10 is formed of the first and second case members 11 and 12, and the first and second case members 11 and 12 are placed on the battery module 30 from the left and right of the battery module 30, that is, from the left and right when viewed in the stacking direction of the battery cells 35 in Embodiment 2. This can facilitate the installation of the upper case 10.

Specifically, as in Embodiment 1, the auxiliary fastening members 50 serve as positioning members of the battery module 30 to position the battery module 30 relative to the lower case 20 (the auxiliary fastening members 50 space the battery module 30 from the lower case 20), and in this state, the upper case 10 can be set on the battery module 30 from the left and right when viewed in the stacking direction of the battery cells 35. This can enhance the accuracy of assembly and simplify the assembly work. In addition, since the upper case 10 is fastened to the battery module 30 in the battery pack 200 of Embodiment 2 as in Embodiment 1 described above, the assembly direction of the upper case 10 is the same as the fastening direction to allow the assembly process to be performed smoothly.

Since the first and second case members 11 and 12 are set from the left and right of the battery module 30 positioned by the auxiliary fastening members 50 in contrast to the conventional example in which the upper case 10 is set from above the battery module 30, no interference such as a collision occurs between the upper case 10 and the battery module 30, and there is no need to form the upper case 10 of a large size in order to avoid contact between the lower end of the upper case 10 and the chamber 31 included in the battery module 30 as in Embodiment 2. Therefore, the components constituting the battery pack 200 can be efficiently arranged in a limited space.

Specifically, while the upper case 10 is set as shown in FIG. 7, the inner surfaces of the first and second case members 11 and 12 abut on the chambers 31 and no space is created between the upper case 10 and the chamber 31. This can prevent an increase in the case size and ensure preferable space without reducing the size of the chamber space CS.

The upper case 10 in Embodiment 2 has abutting surfaces (T1 and T2) for preventing movements of the battery module 30 in the case. As shown in FIG. 6, the first and second case members 11 and 12 are formed to have stepped shapes matching the positions and the shapes of the chamber attaching members 38 such that the abutting surface T1 abutting on the upper surface of the chamber attaching member 38 and the abutting surface T2 abutting on the side of the chamber attaching member 38 are provided on the inner surfaces of the case.

Figure 8:
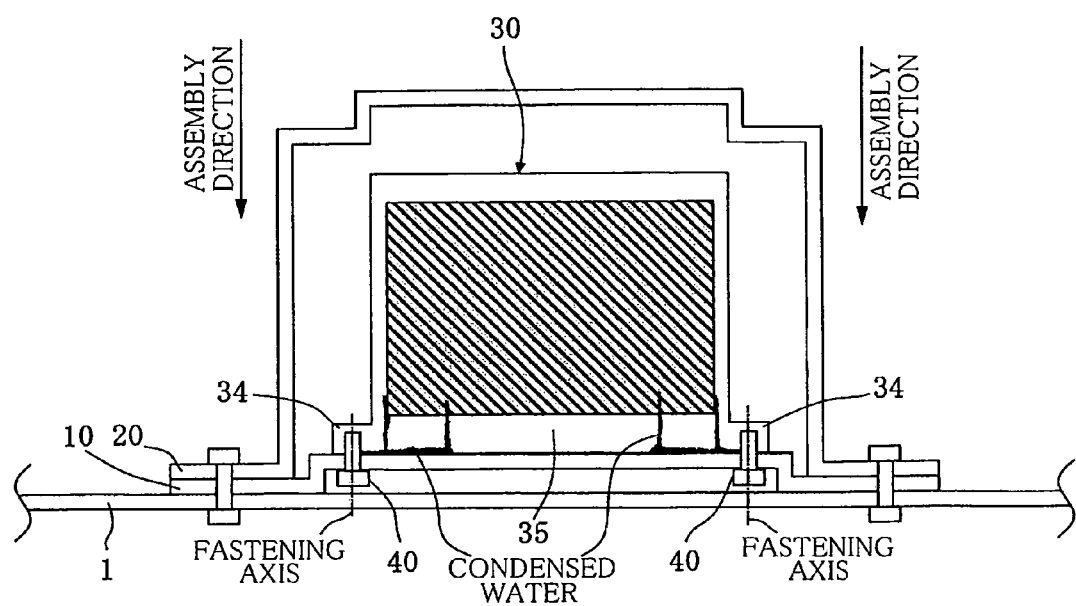
FIG. 8 A section view showing a power supply apparatus for describing a conventional power supply apparatus.

In the conventional power supply apparatus shown in FIG. 8, the power supply unit (power supply module) 30 is fastened only to the lower case 20, and the sides and upper surface of the power supply unit 30 are separated from the case. If any impact is given to the power supply apparatus, the power supply unit 30 can be moved in the space surrounding the power supply unit 30 since the sides and the upper surface of the power supply unit 30 are not supported on the case. The impact or the like should be dealt with only by the fastening to the lower case 20 and thus an excessive load is imposed on the fastening portion to the lower case.

To address this, in Embodiment 2, the abutting surfaces T1 and T2 abutting on the upper surface and the side of the chamber attaching member 38 mounted on the battery module 30, respectively, are provided on the inner surfaces of the first and second case members in addition to the auxiliary fastening members 50. The battery module 30 abuts on both of the upper case 10 and the lower case 20 in the vertical direction to prevent vertical movements thereof, while the battery module 30 abuts on the first and second case members 11 and 12 in the horizontal direction to prevent horizontal movements thereof. In other words, the upper surface or the side of the battery module 30 is caused to abut against the case directly or indirectly with the member such as the chamber attaching member 38 interposed therebetween, thereby eliminating any gap (space) for allowing movements of the battery module 30 upon impact to achieve preferable holding and fixing of the battery module 30.

The invention claimed is:

1. A power supply apparatus comprising:
a power supply unit which includes a plurality of power supply elements stacked with each other;
an upper case and a lower case which house the power supply unit;
an auxiliary fastening portion positioned at least at one end of the power supply unit in a direction in which the power supply elements are stacked, and that fixes the power supply unit to the lower case while providing a space between a lower surface of the power supply unit and the lower case, the auxiliary fastening portion being positioned on a face of one power supply element of the plurality of power supply elements, the face being perpendicular to the direction in which the power supply elements are stacked;
fastening portions which are placed on left and right sides of the power supply unit when the power supply unit is viewed in the direction in which the power supply elements are stacked, the fastening portions fixing the power supply unit with respect to a side of the upper case on the left and the right sides; and
fastening members that each have a fastening axis extending parallel to a horizontal direction and that fasten the power supply elements directly to the upper case.

2. The power supply apparatus according to claim 1, wherein the auxiliary fastening portion indirectly fastens the power supply unit to the lower case with the space interposed therebetween.

3. The power supply apparatus according to claim 2, wherein the power supply unit includes a pair of end plates placed at ends of the power supply elements stacked with each other and restraining the respective power supply elements in the stacking direction, and the auxiliary fastening portion is provided for the end plate.

4. The power supply apparatus according to claim 1, wherein the power supply unit includes a pair of end plates placed at ends of the power supply elements stacked with each other and restraining the respective power supply elements in the stacking direction, and the auxiliary fastening portion is provided for the end plate.

5. The power supply apparatus according to claim 4, wherein the auxiliary fastening portion is provided for each of the end plates and the auxiliary fastening portions sandwich the power supply unit with the end plates interposed therebetween.

6. The power supply apparatus according to claim 4, wherein the end plates are made of resin.

7. The power supply apparatus according to claim 4, further comprising a resin member placed between the end plate and the auxiliary fastening portion.

8. The power supply apparatus according to claim 1, wherein each of the fastening portions includes a first fastening portion provided for the power supply unit and a second fastening portion provided for the upper case, and the first and second fastening portions are fastened together by the fastening members mounted in the horizontal direction.

9. The power supply apparatus according to claim 8, wherein the first fastening portion is formed independently of the power supply unit.

10. The power supply apparatus according to claim 1, wherein the upper case is formed of a first case member and a second case member which are set adjacent to each other in the horizontal direction.

* * * * *